US012506979B2

(12) United States Patent
Moeys

(10) Patent No.: US 12,506,979 B2
(45) Date of Patent: Dec. 23, 2025

(54) DYNAMIC VISION SENSOR, METHOD, AND NOISE FILTERING CIRCUIT FOR A DYNAMIC VISION SENSOR

(71) Applicant: Sony Semiconductor Solutions Corporation, Atsugi (JP)

(72) Inventor: Diederik Paul Moeys, Stuttgart (DE)

(73) Assignee: Sony Semiconductor Solutions Corporation, Atsugi (JP)

( * ) Notice: Subject to any disclaimer, the term of this patent is extended or adjusted under 35 U.S.C. 154(b) by 154 days.

(21) Appl. No.: 18/271,237

(22) PCT Filed: Jan. 7, 2022

(86) PCT No.: PCT/EP2022/050230
§ 371 (c)(1),
(2) Date: Jul. 7, 2023

(87) PCT Pub. No.: WO2022/152619
PCT Pub. Date: Jul. 21, 2022

(65) Prior Publication Data
US 2024/0064424 A1    Feb. 22, 2024

(30) Foreign Application Priority Data
Jan. 14, 2021   (EP) ..................................... 21151702

(51) Int. Cl.
*H04N 25/47* (2023.01)
*G06V 10/30* (2022.01)
(Continued)

(52) U.S. Cl.
CPC ............. *H04N 25/47* (2023.01); *H04N 25/60* (2023.01)

(58) Field of Classification Search
CPC ...... H04N 25/47; H04N 25/60; H04N 25/707; H04N 25/67; H04N 25/77; H04N 25/62;
(Continued)

(56) References Cited

U.S. PATENT DOCUMENTS

2010/0182468 A1 * 7/2010 Posch ..................... H04N 25/77
348/294
2016/0093273 A1   3/2016 Wang et al.
(Continued)

FOREIGN PATENT DOCUMENTS

| CN | 111064865 A | 4/2020 |
|---|---|---|
| EP | 3595295 A1 | 1/2020 |
| WO | 2020/080383 A1 | 4/2020 |

OTHER PUBLICATIONS

International Search Report and Written Opinion mailed on Mar. 17, 2022, received for PCT Application PCT/EP2022/050230, filed on Jan. 7, 2022, 10 pages.

(Continued)

*Primary Examiner* — Marly S Camargo
(74) *Attorney, Agent, or Firm* — XSENSUS LLP

(57) ABSTRACT

Embodiments of the present disclosure provide a dynamic vision sensor, a method, and a noise filtering circuit for a dynamic vision sensor (DVS). The noise filtering circuit is configured to receive a first request signal in response to a first event detected by one of a group of pixels of the DVS. Also, the noise filtering circuit is configured to trigger a timeframe in response to receiving the first request signal. Further, the noise filtering circuit is configured to receive a second request signal in response to a subsequent second event detected by one of the group of pixels. Also, the noise filtering circuit is configured to forward the second request signal to an arbitration logic if the second event is detected within the timeframe, and to block the second request signal (Continued)

from being forwarded to the arbitration logic if the second event is detected outside the timeframe.

20 Claims, 8 Drawing Sheets

(51) Int. Cl.
    *H04N 25/60* (2023.01)
    *H04N 25/67* (2023.01)
    *H04N 25/707* (2023.01)
    *H04N 25/77* (2023.01)
    *H04N 25/78* (2023.01)
    *H10F 39/18* (2025.01)

(58) Field of Classification Search
    CPC ........ H04N 25/78; H10F 39/18; G06V 10/30; G06V 10/26; G06V 20/44; G06V 30/164
    See application file for complete search history.

(56) References Cited

U.S. PATENT DOCUMENTS

| | | |
|---|---|---|
| 2016/0274643 A1 | 9/2016 | Liu et al. |
| 2020/0029033 A1* | 1/2020 | Xu .......................... H04N 25/47 |
| 2020/0396398 A1* | 12/2020 | Romanenko .............. G06T 5/50 |
| 2021/0183925 A1* | 6/2021 | Shukuri .................. H10F 39/18 |
| 2021/0281779 A1* | 9/2021 | Li .......................... H04N 25/78 |
| 2021/0400222 A1 | 12/2021 | Mochizuki |
| 2023/0026592 A1* | 1/2023 | Frey ....................... G06V 10/25 |
| 2024/0373139 A1* | 11/2024 | Moeys .................. H04N 23/90 |

OTHER PUBLICATIONS

Linares-Barranco et al., "Low Latency Event-Based Filtering and Feature Extraction for Dynamic Vision Sensors in Real-Time FPGA Applications" IEEE Access, vol. 7, Sep. 13, 2019, pp. 134926-134942.

Feng et al., "Event Density Based Denoising Method for Dynamic Vision Sensor" Applied Sciences, vol. 10, No. 6, Mar. 16, 2020, pp. 1-18.

* cited by examiner

DYNAMIC VISION SENSOR, METHOD, AND NOISE FILTERING CIRCUIT FOR A DYNAMIC VISION SENSOR

CROSS-REFERENCE TO RELATED APPLICATIONS

The present application is based on PCT filing PCT/EP2022/050230, filed Jan. 7, 2022, and claims priority to EP Application Serial No. 21151702.4, filed Jan. 14, 2021, the entire contents of each are incorporated herein by reference.

FIELD

Embodiments of the present disclosure relate to a dynamic vision sensor, a method, and a noise filtering circuit for a dynamic vision sensor. In particular, the present disclosure relates to a concept for filtering out noise from events detected by a dynamic vision sensor.

Background

Dynamic vision sensors (DVS) are used in various technical applications, e.g., surveillance and automotive applications.

Dynamic vision sensors may comprise a pixel array for detecting changes in illumination of one or more pixels, so-called "events" and a read out circuit for recording and timestamping such events. The read out circuit may record and assign timestamps to events detected by a pixel array of the DVS one after another. Thus, events may be recorded with a delay after their detection which may lead to an insufficient temporal resolution of the DVS for some applications (e.g. high-speed imaging applications).

Hence, there is a demand for an improved concept for dynamic vision sensors.

This demand may be satisfied by the appended independent and dependent claims.

SUMMARY

Embodiments of the present disclosure are based on the finding that noise events resulting from thermal leakage and parasitic photocurrents lead to undesired delays in reading out and assigning timestamps to events ("timestamping") and that filtering out such noise events before a read out circuit for reading out and timestamping, thus, can reduce such delays.

Embodiments of the present disclosure relate to a noise filtering circuit for a dynamic vision sensor (DVS). The noise filtering circuit is configured to receive a first request signal in response to a first event detected by one of a group of pixels of the DVS. Also, the noise filtering circuit is configured to trigger a timeframe in response to receiving the first request signal. Further, the noise filtering circuit is configured to receive a second request signal in response to a subsequent second event detected by one of the group of pixels. Also, the noise filtering circuit is configured to forward the second request signal for causing an arbitration logic to read out, from the group of pixels, a respective pixel which detected the second event if the second event is detected within the timeframe. Also, the noise filtering circuit is configured to block the second request signal from being forwarded to the arbitration logic if the second event is detected outside the timeframe.

The pixels of the group of pixels, e.g., include adjacent pixels of a pixel array of the DVS. Alternatively, or additionally, the pixels may include one or more pixels which are relatively close together in the pixel array compared to other or most of other combinations of pixels or the pixel array. E.g., the pixels may include also one or more pixels which are not located adjacent to one or more other pixels of the group but adjacent to a neighboring pixel of one or more of the pixels. Thus, the first and the second event can be considered spatially correlated to each other.

The timeframe, e.g., is defined such that the first and the second event are considered temporally correlated if the second event occurs or is detected within the triggered timeframe, and temporally uncorrelated if the second event occurs outside the timeframe. In particular, the timeframe can be defined such that the first and the second event most likely result from the same incident or event in a filed of view (FOV) of the DVS. In other words, the timeframe can be defined such that it is statistically not likely that the second event is a noise event which occurs randomly within the triggered timeframe. To this end, the timeframe may be defined with respect to a frequency of noise events of the group of pixels. Thus, the noise filtering circuit may filter out temporally uncorrelated events in order to filter out at least a portion of noise events and, thus, to reduce delays in reading out events of the pixel array. Further, the filtering, in the sense of filtering out noise events, may reduce an amount of resources (e.g. time, bandwidth, energy, computing power) for reading out the events.

Also, the proposed concept for filtering out noise events can be applied to multiple groups of pixels of the pixel array. In particular, the multiple groups may cover the whole pixel array such that the multiple groups include all pixels of the pixel array.

Other embodiments provide a dynamic vision sensor comprising the noise filtering circuit proposed herein.

Further embodiments provide a method for a dynamic vision sensor. The method comprises receiving a first request signal in response to a first event detected by one of a group of pixels of the DVS. Also, the method provides for triggering a timeframe in response to receiving the first request signal. Further, the method comprises receiving a second request signal in response to a subsequent second event detected by one of the group of pixels. Also, the method comprises forwarding the second request signal to the arbitration logic for causing the arbitration logic to read out, from the group of pixels, a respective pixel which detected the second event if the second event is detected within the timeframe and blocking the second request signal from being forwarded to the arbitration logic if the second event is detected outside the timeframe.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
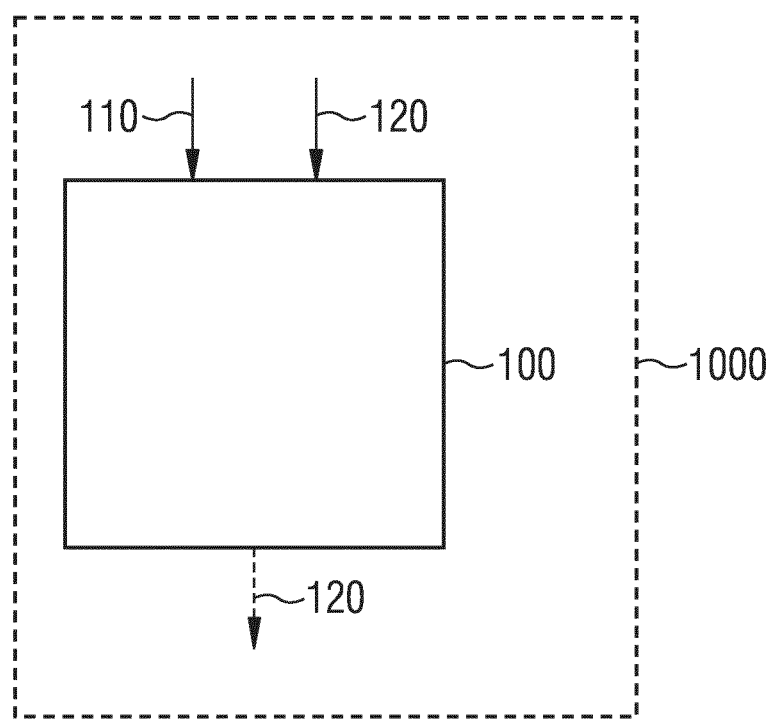
FIG. 1 illustrates a block diagram schematically illustrating an embodiment of a noise filtering circuit for a dynamic vision sensor (DVS)

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates a block diagram schematically illustrating an embodiment of a noise filtering circuit 100 for a dynamic vision sensor (DVS). As indicated by dashed lines, the noise filtering circuit 100 is optionally implemented in a DVS 1000.

It is noted that the DVS can be any sensor for event-based imaging, in the sense of an (spatially resolving) imaging concept which provides for imaging changes in brightness. Alternatively, the DVS is referred to as silicon retina or event (-based) vision sensor (EVS). The DVS may be comprised of or corresponds to an event camera or neuromorphic camera.

The noise filtering circuit 100 may receive a first request signal 110 in response to a first event detected by one of a group of pixels of the DVS and a second request signal 120 in response to a subsequent second event detected by one of the group of pixels.

The first request signal 110 and the second request signal 120, e.g., are generated when an illumination of any one of the pixels of the group changes (by a predefined degree) or due to thermal leakage or parasitic photocurrents. The first and the second request signal may be either generated by the same pixel or by different pixels of the group of pixels.

Events which are generated through thermal leakage or parasitic photocurrents may degrade images of the DVS and exploit resources (e.g. time, energy, computing power bandwidth) for processing such noise events. Therefore, a basic idea is to filter out those noise events resulting from thermal leakage, parasitic photocurrents and/or other confounding effects. Embodiments of the noise filtering circuit 100 are based on the finding that actual/true events, in the sense of events resulting from actual incidents in a field of view of the DVS, generally are detected simultaneously or in short succession (i.e. temporally correlated) and by closely spaced or adjacent pixels (i.e. spatially correlated). In other words, true/actual events are generally spatially and temporally correlated. On the contrary, noise events are generally neither spatially nor temporally correlated. As stated below in more detail, the noise filtering circuit 100 may distinguish between actual/true events and noise events based on this finding for filtering out noise events. In particular, the noise filtering circuit 100 may determine whether the second event is a noise event or a true/actual event with respect to a timing of the first and the second event.

The DVS, e.g., exhibits a pixel array comprising a plurality of pixels. The group of pixels may include multiple/at least two adjacent pixels. E.g. each pixel of the group is placed adjacent to one, multiple, or each of other pixels of the group. Hence, the first and the second event are "spatially correlated".

Further, the noise filtering circuit 100 is configured to check whether the first and the second event are temporally correlated. In order to do so, the noise filtering circuit 100 may trigger a timeframe after the first event in response to receiving the first request signal 110. The noise filtering circuit 100, e.g., uses the first request signal 110 to trigger the timeframe, as outlined in more detail later. The timeframe may be defined sufficiently short such that in consideration of a frequency of noise events it is unlikely (with a probability less than 50%) that a noise event occurs during the timeframe, and sufficiently long to cover temporally correlated actual events, e.g. resulting from the same incident or object in the FOV. In some embodiments, the noise filtering circuit 100 is also configured to adjust the timeframe based on a frequency of noise events, as stated in more detail later. The timeframe, e.g., is between 0.1 µs and 40 ms long. In order to determine whether the first and the second request signal 110 and 120 are temporally correlated, the noise filtering circuit 100 may trigger the timeframe in response to the first event or receiving the first request signal and may determine whether the second event was detected within the timeframe based on a time when the second request signal 120 is received by the noise filtering circuit 100.

So, the second event can be considered temporally and spatially correlated to the first event and, thus, as an actual/true event if it is detected within the timeframe. Otherwise, if the second event is detected outside the timeframe, the second event may be considered temporally uncorrelated and, thus, as a noise event.

The noise filtering circuit 100 then forwards the second request signal 120 if the second event is detected within the timeframe, for causing an arbitration logic to read out/reset, from the group of pixels, a respective pixel which detected the second event. Otherwise, if the second event is detected outside the timeframe, the noise filtering circuit 100 blocks the second request signal 120 from being forwarded to the arbitration logic.

According to this concept, the noise filtering circuit 100 may forward and/or block/filter out several request signals of several further events. In practice, this concept may be iteratively applied.

In particular, the noise filtering circuit 100 may be further configured to trigger a further timeframe in response to the second event. Also, the noise filtering circuit 100 may be configured to forward a subsequent third request signal (not shown) in response to a subsequent third event, if the third event occurs within the further timeframe, for causing the arbitration logic to read out, from the group of pixels, a respective pixel which detected the third event and to block the third request signal from being forwarded to the arbitration logic if the third event is detected outside the further timeframe. Thus, the third request signal is forwarded if the third event is temporally correlated to the first and the second event and, therefore, considered to be a true/actual event and the third request signal is blocked if the third event is temporally uncorrelated to the first and the second event and, thus, deemed to be a noise event. In this way, further subsequent request signals may be forwarded or blocked. E.g., the noise filtering circuit 100 can trigger a further timeframe for subsequent request signals in response to the third event. In particular, the noise filtering circuit 100 may trigger a further timeframe in response to every subsequent event.

The noise filtering circuit 100 may be further configured to reset, from the group of pixels, a respective pixel which detected the second event if the second event is detected outside the timeframe and the second request signal is blocked. If the second request signal is blocked, the arbitration logic may not read out and reset the pixel which detected the second event in order to sensitize the pixel for further changes in illumination. Hence, the noise filtering circuit 100 may reset this pixel to sensitize it for further changes in illumination.

The group of pixels can include an arbitrary number of pixels. Also, the proposed concept can be applied to multiple groups of pixels of the pixel array of the DVS.

Figure 2:
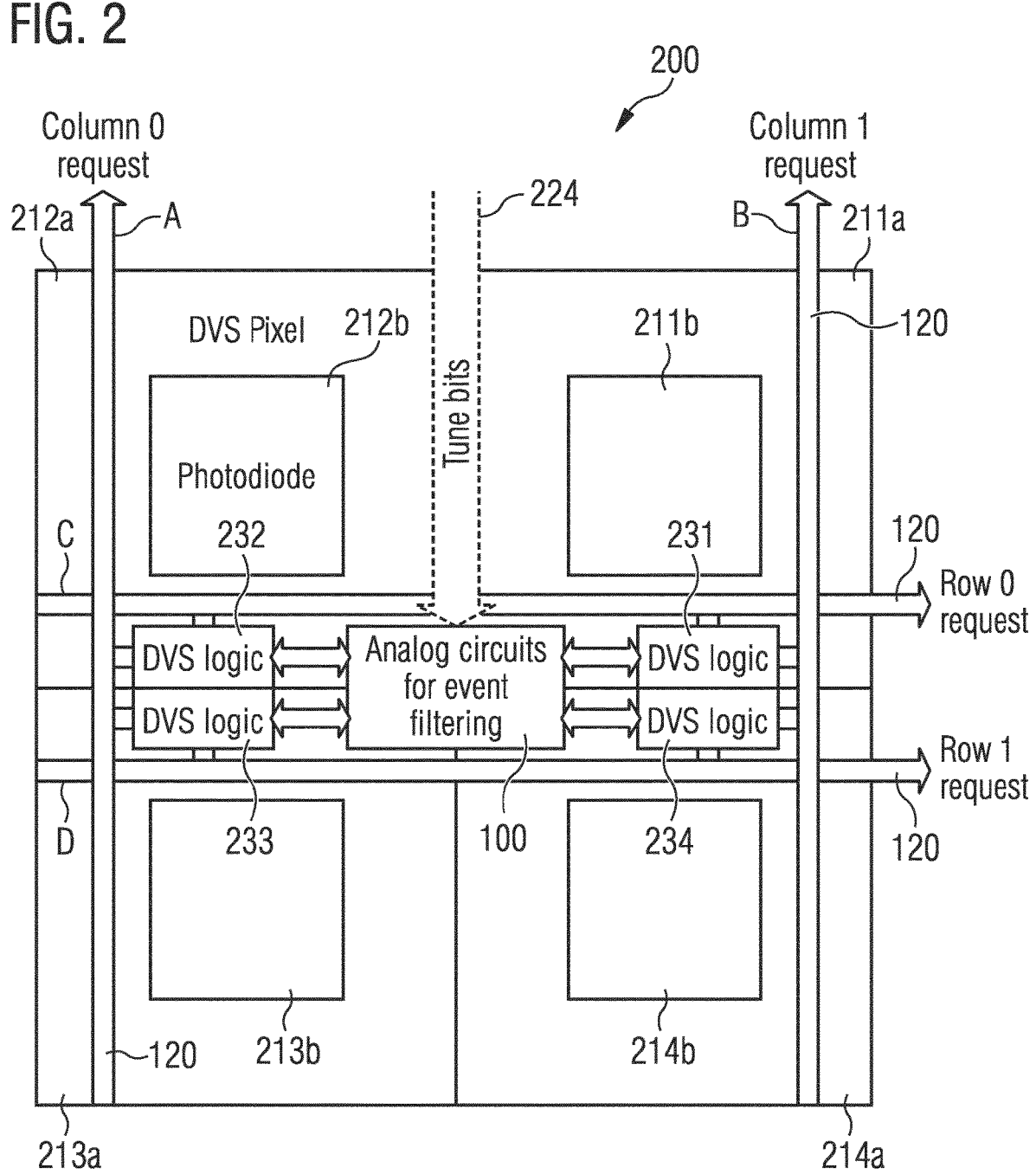
FIG. 2 illustrates a group of pixels of a DVS and an embodiment of the noise filtering circuit.

FIG. 2 illustrates a group of pixels 200 of a DVS and an embodiment of the noise filtering circuit 100. The group of pixels 200 includes pixels 211a, 212a, 213a, and 214a, and each of those pixels 211a to 214a includes a respective photodiode 211b, 212b, 213b, and 214b. Also, each pixel 211a, 212a, 213a, and 214a includes a respective DVS logic circuit 231, 232, 233, and 234. The DVS logic circuits 231, 232, 233, and 234 may generate and forward a request signal to the noise filtering circuit 100 in response to an event detected by a respective pixel. The DVS logic circuits 231, 232, 233, and 234, e.g., generate and forward the first and the second request signal 110 and 120 to the noise filtering circuit 100.

In accordance with the proposed concept, the noise filtering circuit 100 may check whether the second event spatially and temporally correlates with the first event and may forward or block the second request signal 120. As can be seen from FIG. 2, the group of pixels 200 exhibits multiple signal channels A, B, C, and D which are indicative of a column (A, B) and a row (C, D) of the pixels 211a to 214a in the pixel array. In order to enable the arbitration unit to determine a position or address of the second event, the noise filtering circuit 100 may transmit the second request signal 120 via respective signal channels of the respective pixel which detected the second event. E.g., the second request signal 120 is transmitted via the signal channels A and C if pixel 212a detects the second event.

In FIG. 2, the noise filtering circuit, e.g., is or comprises an "analog circuit" for event filtering. In particular, the noise filtering circuit 100 may be configured to define the timeframe based on an energy state of an energy storage and by charging/discharging the energy storage, as described in more detail later with reference to FIG. 3.

Also, the noise filtering circuit 100 may be further configured to adjust charging/discharging the energy storage to adjust the timeframe. For this, the noise filtering circuit 100, e.g., receives a control input 224 for adjusting the charging/discharging the energy storage, as described in more detail later with reference to FIG. 3.

Figure 3:
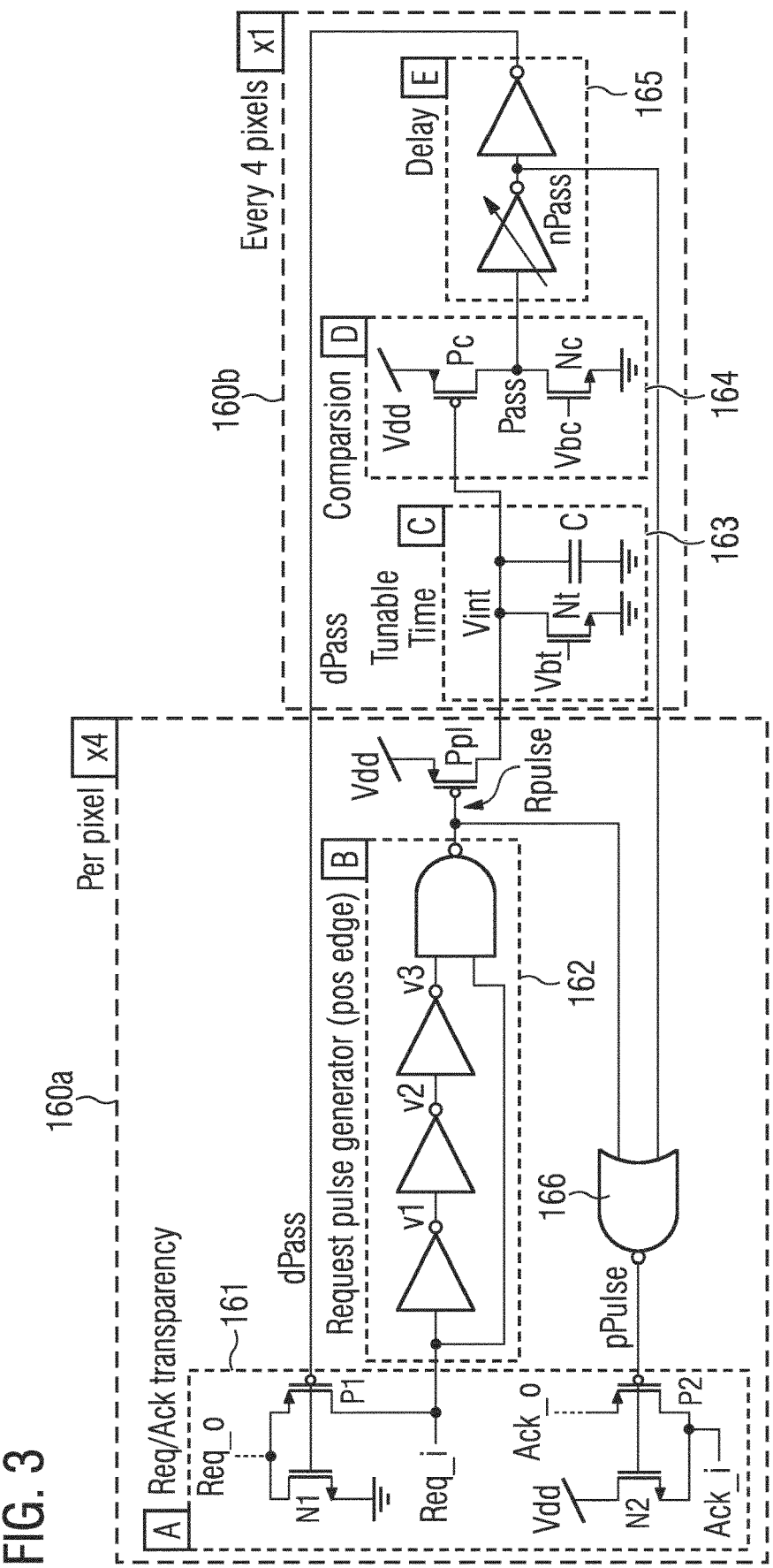
FIG. 3 illustrates a circuit diagram of an embodiment of the noise filtering circuit.
Figure 4:
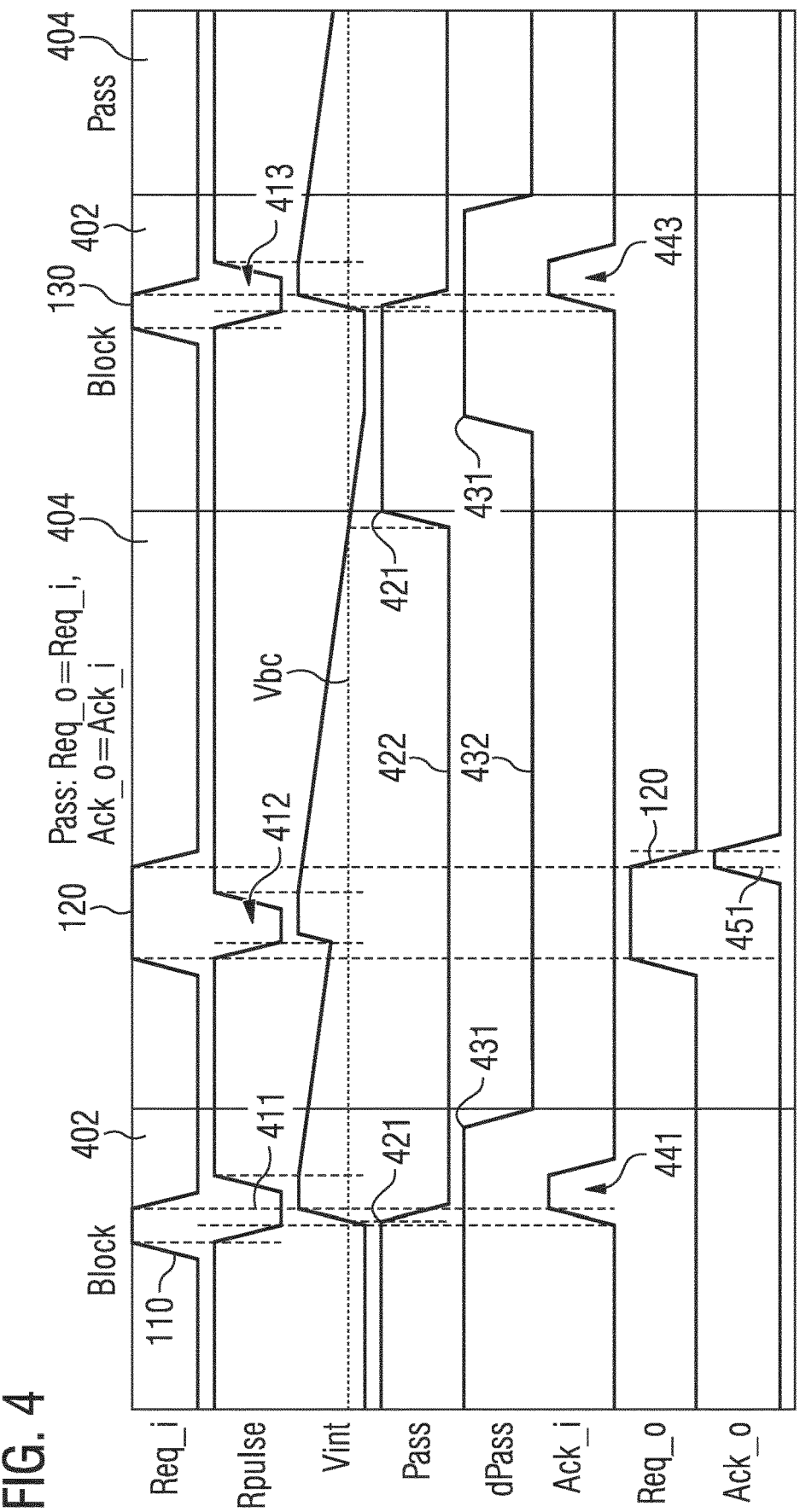
FIG. 4 illustrates a timing diagram of signals for an embodiment of the noise filtering circuit.

FIG. 3 illustrates a circuit diagram of an embodiment of the noise filtering circuit 100. Reference is also made to FIG. 4 which illustrates a timing of signals in the noise filtering circuit 100 from FIG. 3. The abscissa of the timing diagram indicates time and the ordinate of the timing diagram indicates an amplitude of the signal. In particular, the ordinate is to be understood as divided into separate ordinates for the signals.

As can be seen from the circuit diagram, the noise filtering circuit 100 may comprise at least one first subcircuit 160a and a second subcircuit 160b. In practice, the noise filtering circuit 100 may comprise one first subcircuit 160a for each pixel of the group of pixels and one second subcircuit 160b for the group of pixels. In the example of FIG. 2, the noise filtering circuit 100 may accordingly comprise four first subcircuits 160a. The first subcircuit 160a comprises an input/output circuit 161, a request pulse generator circuit 162, a transistor Ppl, and a NOR gate 166. The second subcircuit 160b comprises a capacitor circuit 163, a comparator circuit 164, and a delay circuit 165. The input/output circuit 161 is configured to receive a signal Req_i. As can be seen from the timing diagram, Req_i, e.g., includes the first and the second request signal 110 and 120 from the group of pixels. Also, Req_i comprises a third request signal 130 in response to a third event detected by any one of the group of pixels. The first, the second, and the third event triggering the first, the second, and the third request signal 110, 120, and 130 can be detected by the same or at least two different pixels of the group of pixels. The first, the second, and the third request signal 110, 120, and 130 are indicative of (positive) peaks or pulses in the Req_i. The first, second, and the third request signal 110, 120, and 130 are received one after another, wherein the first signal 110 is received before the second request signal 120, and the second request signal 120 is received before the third request signal 130. The request pulse generator circuit 162 comprises an odd number (e.g. three) of serially connected inverters and a NAND gate which are configured to use the Req_i for generating a pulse signal Rpulse inverted to Req_i. Thus, e.g., a first signal pulse 411, a second signal pulse 412, and a third signal pulse 413 in the pulse signal Rpulse are generated in response to the first, second, and third event or receiving the first, second, and third request signal 110, 120, and 130, respectively. The pulses 411, 412, and 413, e.g., are indicative of (negative) pulses. The request pulse generator circuit 162 is coupled to a transistor Ppl (e.g. a p-channel field-effect transistor, pFET) to control the transistor Ppl using the pulse signal Rpulse. The signal pulses 411, 412, and 413 causes the transistor Ppl to charge a capacitor C of the capacitor circuit to a supply voltage Vdd, i.e. C is charged at least until a capacitor voltage Vint over the capacitor is equal to Vdd. In other words, a pulse width of the pulses 411 to 413 should allow enough time for a complete reset of the capacitor C to the supply voltage Vdd through the transistor Ppl. The skilled person having benefit from the present disclosure will appreciate that the principle explained with reference to FIGS. 3 and 4 can be also applied to other energy storages and, therefore other energy storages may be used instead of capacitor C. Compared to other energy storages the capacitor C may demand less costs, technical effort, and/or space for implementation. As can be seen from Vint in the timing diagram, the capacitor C discharges after the signal pulses 411, 412, and 413 via a transistor Nt of the capacitor circuit 163, e.g. via a n-channel field-effect transistor (nFET). In other words, the capacitor C is discharged (e.g. linearly) by the transistor Nt once Rpulse is terminated. A voltage Vbt applied to a gate of the transistor Nt can be used to adjust a current for discharging the capacitor C and, thus, "how fast" the capacitor C discharges via the transistor Nt. The higher the voltage Vbt, the faster the capacitor C discharges.

The comparison circuit 164 is configured to cause the noise filtering circuit 100 to forward or block request signals based on an energy state of the capacitor C (i.e. based on an amount of energy stored in the capacitor C). In particular, the comparison circuit 164 can cause the noise filtering circuit 100 to forward or block request signals based on a comparison of the energy state with a threshold for the energy state. For this, the comparison circuit 164 compares Vint with a (adjustable) threshold voltage Vbc. The skilled person will understand that this principle is analogously applicable for other energy storages. Further, the comparison circuit 164 is configured to output a control signal Pass indicative for the energy state or the comparison of the energy state with the threshold for the energy state. The control signal Pass, e.g., indicates whether the capacitor voltage Vint is lower or higher than the threshold voltage Vbc. As can be seen from the timing diagram, the control signal Pass, e.g., assumes a high state 421 when the capacitor voltage Vint is lower than Vbc or a low state 422 when the capacitor voltage Vint is higher than the threshold voltage Vbc. By charging C using the signal pulses 411, 412, and 413, the capacitor voltage Vint exceeds Vbc and, e.g., falls short through discharging the capacitor C.

The delay circuit 165 receives and delays the control signal Pass to generate a delayed control signal dPass and provide the delayed control signal dPass to the input/output circuit 161. As can be seen from the timing diagram, dPass lags behind the control signal Pass by a delay defined by the delay circuit 165. The delay circuit 165, e.g., comprises multiple inverters. In the example of FIG. 3, the delay circuit 165 comprises a first and a second inverter downstream of the first inverter, wherein the first inverter is a tunable delay inverter configured to adjust the delay of the delayed control signal dPass to the control signal Pass. The input/output circuit 161 then provides Req_i to the arbitration logic (not shown) or blocks Req_i based on the delayed control signal dPass. The input/output circuit 161, e.g., blocks a request signal if it is received when the delayed control signal dPass is in a high state 431 and forwards a request signal, e.g. the second request signal 120, if it is received when dPass is in a low state 432. Thus, dPass sets the noise filtering circuit 100 to a forwarding mode 404, thereby causing the noise filtering circuit 100 to forward request signals received in forwarding mode 404 like, e.g. the second request signal 120, to the arbitration logic and block request signals received in blocking mode 402, i.e. when the noise filtering circuit 100 is not in forwarding mode 404. A duration of forwarding mode 404 is, e.g., depends on a timeframe it takes for capacitor C to discharge below Vbc after the noise filtering circuit 100 is set to forwarding mode 404. The second request signal 120 causes the noise filtering circuit 100 to recharge capacitor C and, thus, to extend the forwarding mode 404 by another timeframe.

The arbitration logic receives the second request signal 120 and provides an external acknowledge signal Ack_o including a reset/read out pulse 451 to the noise filtering circuit 100 for resetting the pixel which detected the second event using Ack_o.

In order to avoid that request signals generally cause themselves to be forwarded to the arbitration logic, the delay of the delayed control signal dPass to the control signal Pass is defined sufficiently large that a request signal which triggered this timeframe, e.g. the first request signal 110 or the third request signal 130, is not generally forwarded to the arbitration logic. In other words, the delayed control signal dPass, e.g. is delayed enough such that the first request signal 110 triggering the forwarding mode 404 is not provided to the arbitration logic before it can be internally acknowledged and consequentially is withdrawn by Ack_i, as stated in more detail later.

Also, the delay circuit 165 and the request pulse generator circuit 162 provide the pulse signal Rpulse and an inverted control signal nPass between the first and the second inverter to the NOR gate 166 to generate an acknowledge control signal pPulse based on the pulse signal Rpulse and the inverted control signal nPass. The NOR gate 166 provides pPulse to the input/output circuit 161. The acknowledge control signal pPulse causes the input/output circuit 161 to generate an internal acknowledge signal Ack_i or forward the external acknowledge signal Ack_o to pixels which detected request signals to reset those pixels. In the example of, FIGS. 3 and 4, the acknowledge control signal pPulse and the input/output circuit 161 are configured to provide, based on pPulse, the external acknowledge signal Ack_o to a pixel of the first subcircuit 160a if the pixel's request signal (e.g. the second request signal) was forwarded to the arbitration logic and provide the internal acknowledge signal Ack_i otherwise, i.e. if the pixel's request signal was blocked. Thus, the input/output circuit 161 provides, based on pPulse, Ack_i and respective acknowledge pulses 441 and 443 in Ack_i to the pixels which detected the first and the third event to reset those pixels. Otherwise, the input/output circuit 161 provides, based on pPulse, Ack_o and a respective acknowledge pulse 451 in Ack_o to a pixel which detected the second event to reset this pixel and read out the second event.

In particular, the internal acknowledge signal Ack_i causes a received request signal to be "withdrawn" right away before it is forwarded to the arbitration logic when Pass is in the high state 421 and, thus, nPass in a low state. In other words, request signals which are received while Pass is in the high state 421 are also blocked from being forwarded to the arbitration logic. Thus, Pass sets the noise filtering circuit 100 from forwarding mode 404 to blocking mode 402 when it assumes the high state 421, as can be seen from the timing diagram.

In accordance with the above principle of the example of FIGS. 3 and 4, the noise filtering circuit 100, e.g., receives the first request signal 110 in blocking mode 402 and triggers a timeframe in which the noise filtering circuit 100 is in forwarding mode 404. The pixel which detected the first event and, thus, triggered the first request signal 110 is reset using Ack_i. Request signals like, e.g. the second request signal 120, which are received in this timeframe and, thus, are considered temporally correlated to the first request signal 110 and forwarded to the arbitration logic. The arbitration logic then provides the read out pulse 451 in Ack_o and the input/output circuit 161 forwards the read out pulse 451 to the pixel which detected the second event to read out and reset this pixel. As mentioned above, the second request signal 120 causes the capacitor C to charge and, therefore, triggers a further timeframe in which the noise filtering circuit 100 is in forwarding mode 404. Thus, the duration of the noise filtering circuit 100 in forwarding mode 404 is extended. In other examples, request signals following the second request signal 120 are received in the timeframe triggered by the second request signal 120 and further extend the duration of the noise filtering circuit 100 in forwarding mode 404 analogously. In the example of FIGS. 3 and 4, this timeframe expires and the noise filtering circuit 100 changes to the blocking mode 402. As long as the noise filtering circuit 100 does not receive a further request signal, the noise filtering circuit 100 may remain in the blocking mode 402. As can be seen in the timing diagram, the noise filtering circuit 100 receives the third request signal 130 in the blocking mode 402 and thus triggers a further timeframe for the noise filtering circuit 100 in the forwarding mode 404 analogously to the first request signal 110.

The third event triggering the third request signal 130, e.g., is a noise event and, thus, not temporally correlated to the second event. Using the proposed concept for noise filtering, the third request signal 130 is blocked and not forwarded to the arbitration logic for recording the third event. Hence, resources (e.g. bandwidth, time, energy, computing power, etc.) for recording the third event are saved. Further, delays in recording actual/true events may be reduced, thereby enhancing a temporal resolution of the DVS.

In some embodiments, the noise filtering circuit 100 is configured to adjust the timeframe. In particular, the timeframe can be adapted by one or more parameters. In the example of FIGS. 3 and 4, those parameters, e.g., comprise Vbt, Vbc, one or more parameters which affect the delay of dPass to Pass, a capacitance of capacitor C, etc. Referring back to FIG. 2, the control input 224, accordingly, may be indicative of one or more of those parameters.

The noise filtering circuit 100 may be also configured to adjust the timeframe based on a frequency of noise events. The frequency of noise events may particularly depend on a temperature (e.g. ambient temperature) and/or an illumination of the environment of the DVS. In practice, the noise filtering circuit 100 may be therefore configured to adjust charging/discharging the energy storage, the threshold, and/or the energy storage based on the temperature and/or based on the illumination of the environment of the DVS, e.g., to reduce an influence of noise events. To efficiently filter out noise events, the noise filtering circuit 100 may be, therefore, configured to reduce the timeframe for an increasing frequency of noise events and vice versa. The hotter and/or brighter the environment, the higher might be the frequency of noise events. For this reason, the noise filtering circuit 100 may reduce the timeframe for an increasing temperature and/or an increasing illumination and vice versa. In other words, the timeframe may be adjusted via the above parameters and based on the temperature and/or the illumination. For example, the noise filtering circuit 100 may increase Vbt and/or reduce the capacitance of capacitor C to reduce the timeframe or vice versa. For this, the capacitor C, e.g., is or comprises a programmable capacitor bank with adjustable capacitance.

The skilled person having benefit from the present disclosure will appreciate that the basic principle for filtering events of a DVS based on the energy state of an energy storage can be also implemented using another or a modified circuit architecture, other, and/or further electronic components. In particular, the energy storage may comprise one or more of a capacitor (example of FIGS. 3 and 4), a battery, a coil, and other means for storing electrical energy.

Figure 5:
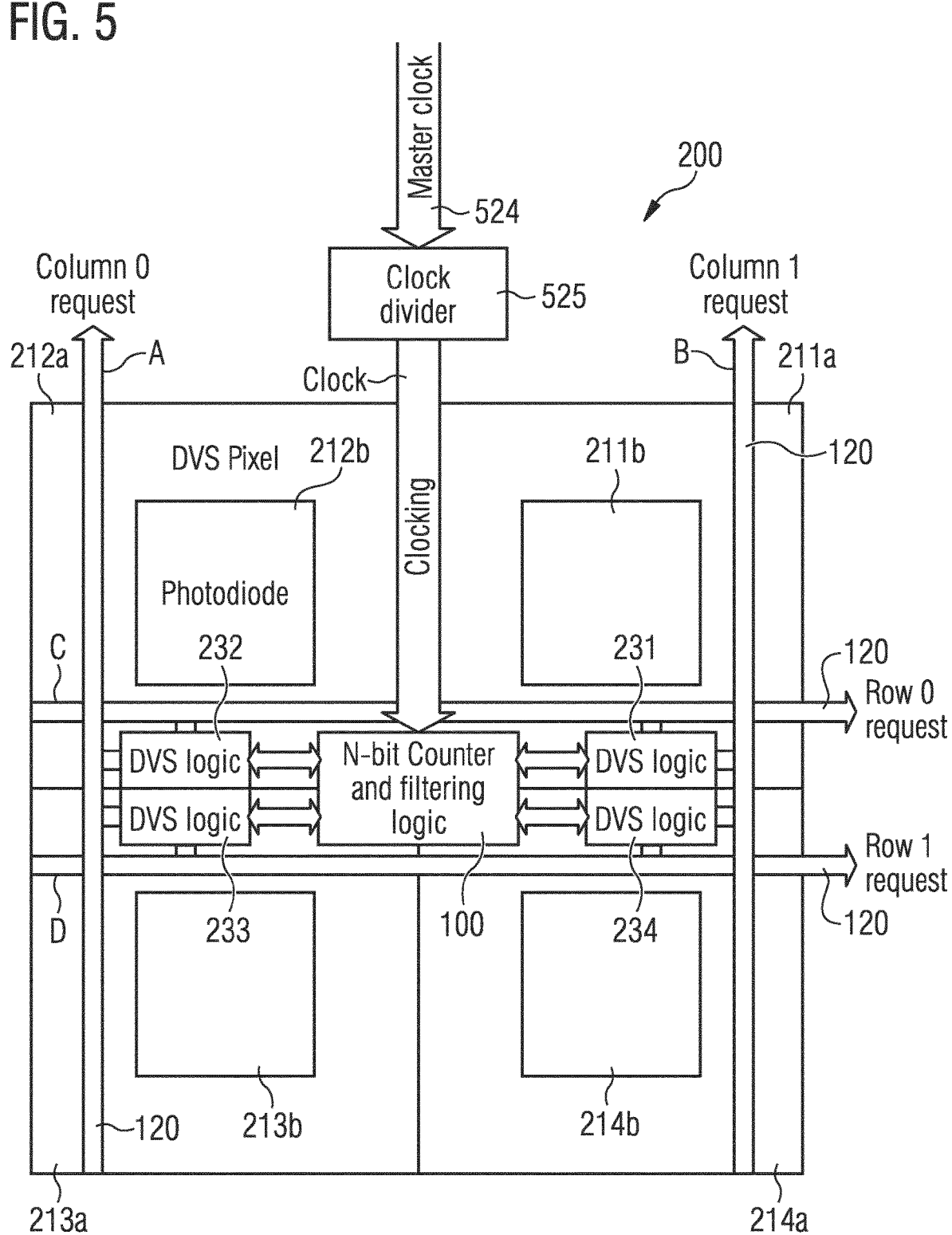
FIG. 5 illustrates a group of pixels of a DVS and an embodiment of the noise filtering circuit.

FIG. 5 illustrates a group of pixels of a DVS and another embodiment of the noise filtering circuit 100. In difference to the example of FIGS. 3 and 4, the noise filtering circuit 100 from FIG. 5 is configured to define the timeframe based on a clock signal Clock. To this end, a clock divider circuit 525 may generate the clock signal Clock based on a master clock signal 524 for the pixel array of the DVS and provide the clock signal Clock to the noise filtering circuit 100. The master clock signal 524 may be analogously used for noise filtering in other groups of pixels of the DVS.

Figure 6:
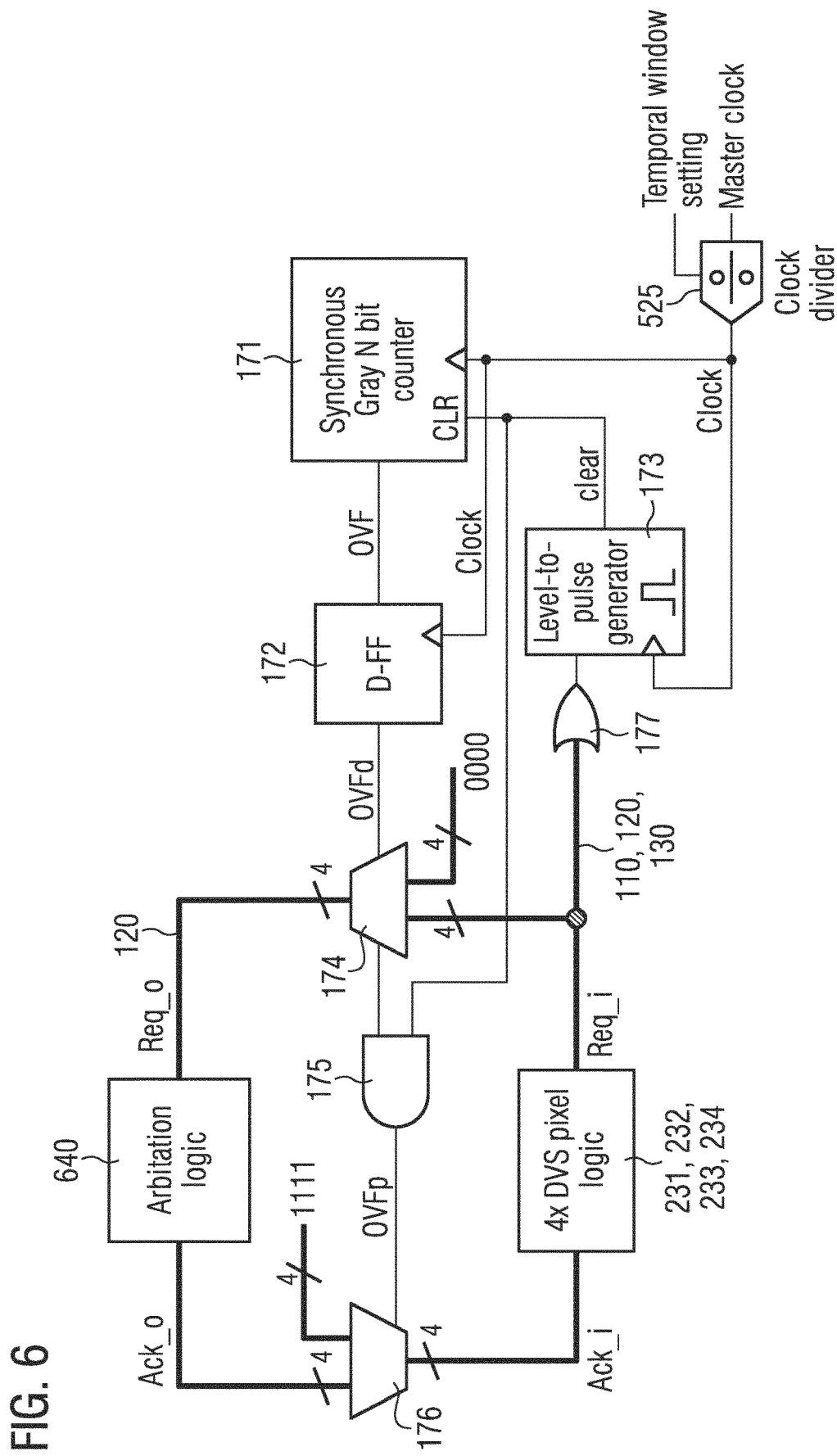
FIG. 6 illustrates a circuit diagram of an embodiment of the noise filtering circuit.
Figure 7:
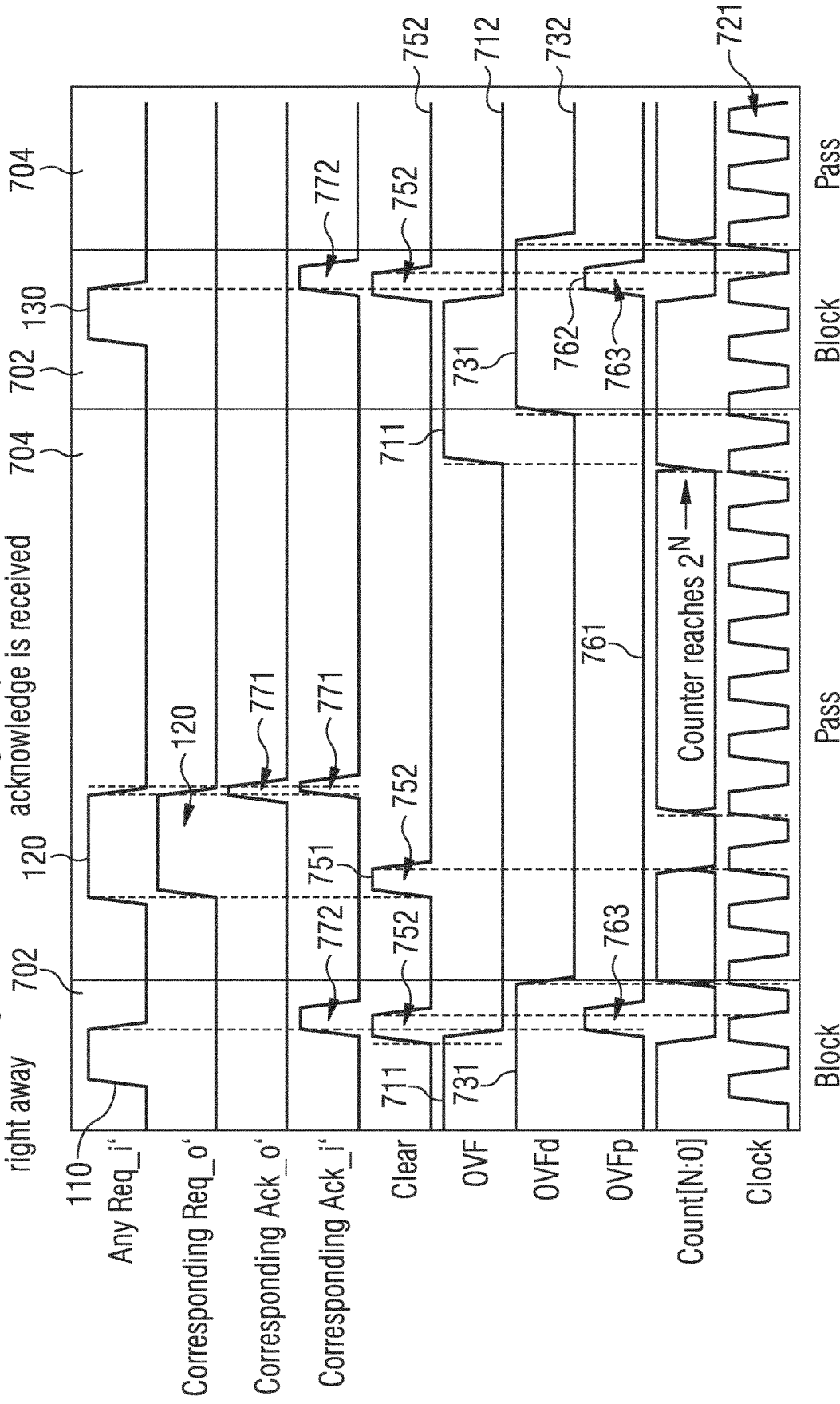
FIG. 7 illustrates a timing diagram of signals for an embodiment of the noise filtering circuit.

FIG. 6 exemplary illustrates a circuit diagram of an embodiment of the noise filtering circuit 100 using the clock signal Clock for defining the timeframe. Reference is also made to FIG. 7 which illustrates a timing of signals in the noise filtering circuit 100 from FIG. 6. The abscissa of the timing diagram indicates time and the ordinate of the timing diagram indicates an amplitude of the signals. In particular, the ordinate is to be understood as divided into separate ordinates for the signals.

As can be seen from the circuit diagram, the noise filtering circuit 100, e.g., comprises a counter (e.g. a gray N bit counter), a delay flip-flop 172, a level-to-pulse generator 173, a first multiplexer 174, a an AND gate 175, a second multiplexer 176 and an OR gate 177.

The clock divider 525 provides the clock signal Clock to the level-to-pulse generator 173, to the counter 171, and to the delay flip-flop 172 for synchronization of their outputs.

The counter 171 is configured to count clock cycles 721 of the clock signal Clock and to provide a signal OVF indicative of a count of clock cycles 721 counted. The counter, e.g., is a synchronous (N bit) counter. In particular, the counter 171 can be a N-bit Gray counter. Alternatively, other counters may be used.

As can be seen from FIG. 7, OVF, e.g., is a binary signal which can assume a high state 711 and a low state 712 based on the count of cycles. OVF is in the high state 711 when the count is higher that a predefined limit and in the low state 712 otherwise. OVF is provided to the delay flip-flop 172. As can be also seen in FIG. 7, the delay flip-flop 172 is configured to delay OVF by at least or exactly one clock cycle using the clock signal Clock in order to avoid that received request signals cause themselves to be forwarded to an arbitration logic 640 of the DVS, as stated in more detail later. The delayed OVF is referred to as OVFd. The delay flip-flop 172 provides OVFd to the first multiplexer 174. The first multiplexer 174 also receives a zero signal "0000" having a constant amplitude equal to zero and, from the DVS logic circuits 231 to 234, signals Req_i' which are indicative of events detected by pixels of the group.

Req_i', e.g., comprise a signal Req_1' of pixel 211a, Req_2' of pixel 212a, Req_3' of pixel 213a, and Req_4' of pixel 214a. Req_i', e.g., are indicative of request signals, e.g., the first the second and the third request signal 110, 120, and 130 from one or more of the pixels 211a to 214a. The first multiplexer 174 is configured to select, based on OVFd, one of the signals Req_i' and the zero signal 0000, and forward the selected signal as a signal Req_o' to the arbitration logic 640. OVFd can either be in a high state 731 or in a low state 732. As can be seen from the timing diagram, the first multiplexer 174, e.g., selects the zero signal 0000 when OVFd is in the high state 731 and selects a Req_i,' more specifically one of the Req_i' of a pixel which detected an event, when OVFd is in the low state 732. Thus, the first multiplexer 174 forwards request signals, e.g., the second request signal 120 in the signals Req_i' when OVFd is in the low state 732, and forwards the zero signal 0000 when OVFd is in the high state 731.

Req_i' is also provided to the level-to-pulse generator 173 via the OR gate 177. The level-to-pulse generator 173 also receives the clock signal Clock. The level-to-pulse generator 173 provides the counter 171 with a clear signal "clear" which is synchronous to the clock signal Clock. As can be seen from the timing diagram, the clear signal takes a high state 751 for pulses 752 in the clear signal and in response to request signals, e.g., the first, the second, and the third request signal 110, 120, and 130. The pulses 752 cause the counter 171 to clear and restart the count after pausing for one cycle of the clock signal Clock.

The delay flip-flop 172 provides OVFd to the AND gate 175. The AND gate 175 further receives the clear signal. The AND gate 175 provides a signal OVFp to the second multiplexer 176. As can be seen from the timing diagram, OVFp can assume a high state 762 for pulses 763 in OVFp, when the clear signal and OVFd both are in the high state.

Further, the second multiplexer 176 receives an external acknowledge signal Ack_o' from the arbitration logic 640 and a signal "1111" having an amplitude equivalent to a logic "high" (i.e. the logic level "high"). As can be seen from the timing diagram, the second multiplexer 176 is configured to select, based on OVFp, one of Ack_o' and the signal 1111 for an internal acknowledge signal Ack_i' for resetting ("acknowledging") pixels which detected an event, e.g. the first, the second and/or the third event. Ack_o' is selected and if OVFp is in the low state 761, and the signal 1111 is selected if OVFp is in the high state 762. Ack_o', e.g., includes a pulse 771 in response to a request signal, e.g. the second request signal 120, being received by the arbitration logic 640. A pixel which detected an event is reset through the external acknowledge signal Ack_o' of the arbitration logic 640 if a request signal indicative of this event is forwarded to the arbitration logic 640. E.g., in response to the second request signal 120 being received by the arbitration logic 640, the arbitration logic 640 generates pulse 771 in Ack_o' and pulse 771 is forwarded as Ack_i' to a pixel which detected the second event for resetting this pixel. Otherwise, i.e. if a request signal of an event is blocked, a pulse 772 of the signal 1111, e.g., is forwarded to reset a pixel which detected this event.

As can be seen from the timing diagram, OVFp can set the noise filtering circuit 100 to a forwarding mode 704 and to a blocking mode 702. In the illustrated example, OVFp triggers a timeframe in which noise filtering circuit 100 is in forwarding mode 704 by clearing and restarting the count if a request signal, e.g. the first request signal 110, is received. A pixel which detected the first event is reset by the pulse 772. Due to the delay of OVFd, the first request signal 110 does not cause itself to be forwarded to the arbitration logic 640. Then, the noise filtering circuit 100 receives the second request signal 120 within the timeframe triggered by the first request signal 110 and, when the noise filtering circuit 100 is in forwarding mode 704. Thus, the second request signal 120 and the second event are considered temporally correlated to the first request signal 110 and the first event. Since, OVFd is in the low state 732, when the second request signal 120 is received, the first multiplexer 174 forwards the second request signal 120 to the arbitration logic 640 in order to record the second event. The arbitration logic 640, then, generates the pulse 771 in the external acknowledge signal Ack_o'. The second multiplexer 176 selects, based on OVFp, the external Ack_o' and provides pulse 771 via a respective DVS logic 231, 232, 233, or 234 to a pixel which detected the second event for resetting this pixel. As can be seen from the timing diagram, the second request signal 120 triggers the pulse 752 in the clear signal and, thus, clears and restarts the count. Through restarting the count, the second request signal 120 triggers a further timeframe in which the noise filtering circuit 100 is in forwarding mode 704. As soon as the count exceeds the predefined limit, OVF and OVFd change to the high states 711 and 731. As soon as OVFd changes to the high state 731, the noise filtering circuit 100 is set to the blocking mode 702. Thus, events and related request signals, which are received in the blocking mode 702, are considered temporally uncorrelated to the second event and therefore blocked and not forwarded to the arbitration logic 640. Also, the third request signal 130 sets the noise filtering circuit 100 to the forwarding mode 704, clears, and restarts the count again.

The third event triggering the third request signal 130, e.g., is deemed to be a noise event and, thus, not temporally correlated to the second event. Using the proposed concept for noise filtering, the third request signal 130 is blocked and not forwarded to the arbitration logic for recording the third event. Hence, resources (e.g. bandwidth, time, energy, computing power, etc.) for recording the third event may be saved. Further, delays in recording actual/true events may be reduced, thereby enhancing a temporal resolution of the DVS.

The predefined limit for the count, e.g., is less or equal to $2^N$, wherein N denotes a number of bits or flip-flops of the (synchronous) counter 171. In order to adjust the timeframe, the noise filtering circuit 100 may be configured to adjust the predefined limit. In other words, the control circuit 100 may be configured to adjust the timeframe by adjusting the count of cycles of the clock signal for the timeframe. Accordingly, the lower limit for the timeframe is equal to a period of time of one cycle of the clock signal. The upper limit for the timeframe is limited by a value up to which the counter 171 can count. For an N-bit Gray counter, this value is limited by a number of bits of the counter.

Further, the noise filtering circuit 100 may be configured to adjust the timeframe based on the frequency of noise events. In order to do so, the noise filtering circuit 100, e.g., adjusts a period of cycles of the clock signal Clock based on the frequency of noise events. Generally, the frequency of noise events depends on the temperature (e.g. ambient temperature) and the illumination of the environment. Thus, the noise filtering circuit 100 may adjust the period of cycles or a frequency of the clock signal based on the temperature and/or based on the illumination to adjust the timeframe to the frequency of noise events. The clock divider, e.g., comprises an adjustable gated flip-flop-clock divider which is configured to adjust the period of cycles. In particular, the master clock and/or the clock divider may be configured to decrease the period of cycles or increase the frequency if the temperature and/or the illumination increases. The hotter and/or brighter the environment, the higher might be the frequency of noise events. To efficiently filter out noise events, the noise filtering circuit 100 may be configured to reduce the timeframe for an increasing frequency of noise events and vice versa. In order to do so, the noise filtering circuit 100 may be configured to reduce the period of cycles if the temperature and/or the illumination increases.

The skilled person having benefit from the present disclosure will appreciate that the basic principle for filtering events of a DVS using a clock signal can be also implemented using another or a modified circuit architecture, other, and/or further electronic components and/or other signals or signal profiles.

It is also noted that, based on the clock signal, the timeframe can be set or adjusted more precisely than based on the energy state of the energy storage. Therefore, using the clock signal for timing allows to distinguish more precisely between actual/true events and noise events.

The proposed principles for filtering events of dynamic vision sensors can be also implemented by a method, as described below.

Figure 8:
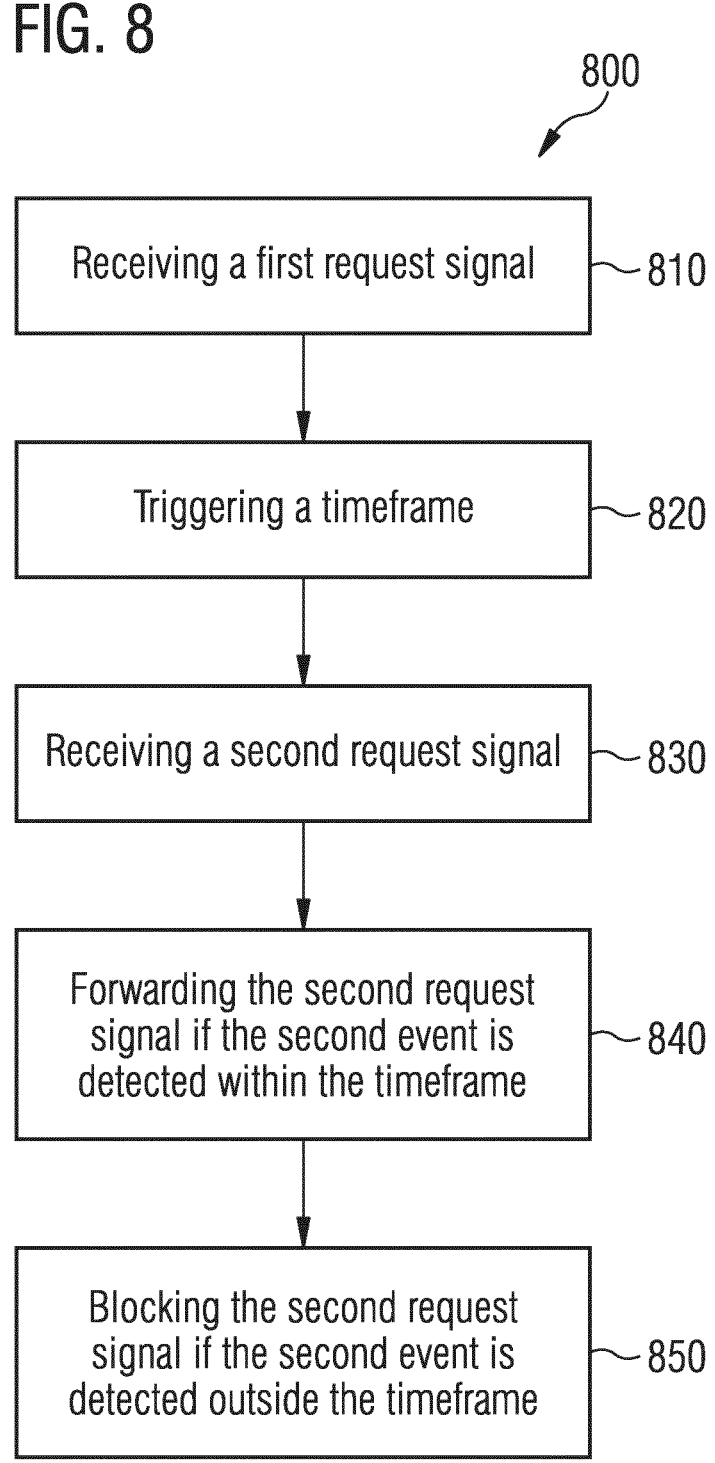
FIG. 8 illustrates a flow chart schematically illustrating an embodiment of a method for a DVS.

FIG. 8 illustrates a flow chart schematically illustrating an embodiment of a method 800 for a DVS.

Method 800 comprises receiving 810 a first request signal in response to a first event detected by one of a group of pixels of the DVS. Also, method 800 comprises triggering 820 a timeframe in response to receiving the first request signal. Further, method 800 comprises receiving 830 a second request signal in response to a subsequent second event detected by one of the group of pixels. Method 800 further comprises forwarding 840, if the second event is detected within the timeframe, the second request signal to the arbitration logic for causing the arbitration logic to read out, from the group of pixels, a respective pixel which detected the second event and blocking 850, if the second event is detected outside the timeframe, the second request signal from being forwarded to the arbitration logic.

The (noise) filtering according to method 800 may allow enhanced temporal resolution in applications in a DVS.

More details and aspects of method 800 are explained in connection with the examples described herein. Also, method 800 may comprise one or more additional optional features corresponding to one or more aspects of those examples.

Further embodiments pertain to:

(1) A noise filtering circuit for a dynamic vision sensor, DVS, wherein the noise filtering circuit is configured to:
  receive a first request signal in response to a first event detected by one of a group of pixels of the DVS;
  trigger a timeframe in response to receiving the first request signal;
  receive a second request signal in response to a subsequent second event detected by one of the group of pixels;
  if the second event is detected within the timeframe, forward the second request signal for causing an arbitration logic to read out, from the group of pixels, a respective pixel which detected the second event; and
  if the second event is detected outside the timeframe, block the second request signal from being forwarded to the arbitration logic.

(2) The noise filtering circuit of (1), wherein the noise filtering circuit is further configured to
  trigger a further timeframe in response to the second event;
  forward a subsequent third request signal in response to a subsequent third event, if the third event occurs within the further timeframe, for causing the arbitration logic to read out, from the group of pixels, a respective pixel which detected the third event; and
  block the third request signal from being forwarded to the arbitration logic if the third event is detected outside the further timeframe.

(3) The noise filtering circuit of (1) or (2), wherein the noise filtering circuit is further configured to reset, from the group of pixels, a respective pixel which detected the second event if the second event is detected outside the timeframe and the second request signal is blocked.

(4) The noise filtering circuit of any one of (1) to (3), wherein the group of pixels comprises at least two adjacent pixels.

(5) The noise filtering circuit of any one of (1) to (4), wherein the noise filtering circuit is configured to use the first request signal to trigger the timeframe.

(6) The noise filtering circuit of any one of (1) to (5), wherein the noise filtering circuit is configured to define the timeframe based on an energy state of an energy storage and by charging/discharging the energy storage.

(7) The noise filtering circuit of (6), wherein the noise filtering circuit is further configured to adjust charging/discharging the energy storage to adjust the timeframe.

(8) The noise filtering circuit of (6) or (7), wherein the noise filtering circuit is further configured to adjust charging/discharging the energy storage based on a temperature and/or based on an illumination of the environment of the DVS.

(9) The noise filtering of any one of (1) to (8), wherein the noise filtering circuit is further configured to receive a clock signal, wherein the timeframe comprises a predefined count of cycles of the clock signal.

(10) The noise filtering circuit of (9), wherein the control circuit is configured to adjust the timeframe by adjusting the count of cycles of the clock signal for the timeframe.

(11) The noise filtering circuit of (9) or (10), wherein the noise filtering circuit further comprises a clock configured to
  generate the clock signal; and
  adjust a period of cycles of the clock signal based on a temperature and/or based on an illumination of the environment of the DVS.

(12) The noise filtering circuit of (11), wherein the clock is further configured to decrease the period of cycles if the temperature and/or the illumination increases.

(13) A dynamic vision sensor, DVS, comprising the noise filtering circuit of any one of (1) to (12).

(14) A method for a dynamic vision sensor, DVS; the method comprising:
  receiving a first request signal in response to a first event detected by one of a group of pixels of the DVS;
  triggering a timeframe in response to receiving the first request signal;
  receiving a second request signal in response to a subsequent second event detected by one of the group of pixels;
  forwarding, if the second event is detected within the timeframe, the second request signal to the arbitration logic for causing the arbitration logic to read out, from the group of pixels, a respective pixel which detected the second event; and
  blocking, if the second event is detected outside the timeframe, the second request signal from being forwarded to the arbitration logic.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A noise filtering circuit for a dynamic vision sensor, DVS, wherein the noise filtering circuit is configured to:
   receive a first request signal in response to a first event detected by one of a group of pixels of the DVS;
   trigger a timeframe in response to receiving the first request signal, wherein the timeframe is adjusted based on a frequency of noise events of the group of pixels;
   receive a second request signal in response to a subsequent second event detected by one of the group of pixels;
   if the second event is detected within the timeframe, forward the second request signal for causing an arbitration logic to read out, from the group of pixels, a respective pixel which detected the second event; and
   if the second event is detected outside the timeframe, block the second request signal from being forwarded to the arbitration logic.

2. The noise filtering circuit of claim 1, wherein the noise filtering circuit is further configured to
   trigger a further timeframe in response to the second event;
   forward a subsequent third request signal in response to a subsequent third event, if the third event occurs within the further timeframe, for causing the arbitration logic to read out, from the group of pixels, a respective pixel which detected the third event; and
   block the third request signal from being forwarded to the arbitration logic if the third event is detected outside the further timeframe.

3. The noise filtering circuit of claim 1, wherein the noise filtering circuit is further configured to reset, from the group of pixels, a respective pixel which detected the second event if the second event is detected outside the timeframe and the second request signal is blocked.

4. The noise filtering circuit of claim 1, wherein the group of pixels comprises at least two adjacent pixels.

5. The noise filtering circuit of claim 1, wherein the noise filtering circuit is configured to use the first request signal to trigger the timeframe.

6. The noise filtering circuit of claim 1, wherein the noise filtering circuit is configured to define the timeframe based on an energy state of an energy storage and by charging/discharging the energy storage.

7. The noise filtering circuit of claim 6, wherein the noise filtering circuit is further configured to adjust charging/discharging the energy storage to adjust the timeframe.

8. The noise filtering circuit of claim 6, wherein the noise filtering circuit is further configured to adjust charging/discharging the energy storage based on a temperature and/or based on an illumination of the environment of the DVS.

9. The noise filtering of claim 1, wherein the noise filtering circuit is further configured to receive a clock signal, wherein the timeframe comprises a predefined count of cycles of the clock signal.

10. The noise filtering circuit of claim 9, wherein the control circuit is configured to adjust the timeframe by adjusting the count of cycles of the clock signal for the timeframe.

11. The noise filtering circuit of claim 9, wherein the noise filtering circuit further comprises a clock configured to
   generate the clock signal; and
   adjust a period of cycles of the clock signal based on a temperature and/or based on an illumination of the environment of the DVS.

12. The noise filtering circuit of claim 11, wherein the clock is further configured to decrease the period of cycles if the temperature and/or the illumination increases.

13. A dynamic vision sensor, DVS, comprising the noise filtering circuit of claim 1.

14. A method for a dynamic vision sensor, DVS; the method comprising:
   receiving a first request signal in response to a first event detected by one of a group of pixels of the DVS;
   triggering a timeframe in response to receiving the first request signal, wherein the timeframe is adjusted based on a frequency of noise events of the group of pixels;

receiving a second request signal in response to a subsequent second event detected by one of the group of pixels;

forwarding, if the second event is detected within the timeframe, the second request signal to the arbitration logic for causing the arbitration logic to read out, from the group of pixels, a respective pixel which detected the second event; and blocking, if the second event is detected outside the timeframe, the second request signal from being forwarded to the arbitration logic.

15. The method of claim 14, further comprising adjusting charging/discharging of an energy storage based on a temperature and/or based on an illumination of the environment of the DVS.

16. The method of claim 14, further comprising receiving a clock signal, wherein the timeframe includes a predefined count of cycles of the clock signal.

17. The method of claim 16, further comprising adjusting the timeframe by adjusting the count of cycles of the clock signal for the timeframe.

18. A non-transitory computer readable storage device having computer readable instructions that when executed by circuitry to filter noise for a dynamic vision sensor, DVS by causing the circuitry to:

receive a first request signal in response to a first event detected by one of a group of pixels of the DVS;

trigger a timeframe in response to receiving the first request signal, wherein the timeframe is adjusted based on a frequency of noise events of the group of pixels;

receive a second request signal in response to a subsequent second event detected by one of the group of pixels;

if the second event is detected within the timeframe, forward the second request signal for causing an arbitration logic to read out, from the group of pixels, a respective pixel which detected the second event; and if the second event is detected outside the timeframe, block the second request signal from being forwarded to the arbitration logic.

19. The non-transitory computer readable storage device of claim 18, further comprising causing the circuitry to adjust charging/discharging of an energy storage based on a temperature and/or based on an illumination of the environment of the DVS.

20. The non-transitory computer readable storage device of claim 18, further comprising causing the circuitry to receive a clock signal, wherein the timeframe includes a predefined count of cycles of the clock signal.

* * * * *